US011641134B2

(12) United States Patent
Mohan et al.

(10) Patent No.: US 11,641,134 B2
(45) Date of Patent: May 2, 2023

(54) WIRELESS CHARGING DEVICE AND A METHOD FOR DETECTING A RECEIVER DEVICE

(71) Applicant: GENERAL ELECTRIC COMPANY, Schenectady, NY (US)

(72) Inventors: Sivabalan Mohan, Bangalore (IN); Somakumar Ramachandrapanicker, Bangalore (IN); Arun Kumar Raghunathan, Bangalore (IN); Rajendra Naik, Bangalore (IN); Adnan Kutubuddin Bohori, Bangalore (IN)

(73) Assignee: General Electric Company, Schenectady, NY (US)

( * ) Notice: Subject to any disclaimer, the term of this patent is extended or adjusted under 35 U.S.C. 154(b) by 46 days.

(21) Appl. No.: 16/604,481

(22) PCT Filed: Mar. 19, 2018

(86) PCT No.: PCT/US2018/023060
§ 371 (c)(1),
(2) Date: Oct. 10, 2019

(87) PCT Pub. No.: WO2018/190986
PCT Pub. Date: Oct. 18, 2018

(65) Prior Publication Data
US 2020/0059121 A1 Feb. 20, 2020

(30) Foreign Application Priority Data
Apr. 14, 2017 (IN) .............................. 201741013385

(51) Int. Cl.
*H02J 50/90* (2016.01)
*H02J 50/12* (2016.01)
(Continued)

(52) U.S. Cl.
CPC ................ *H02J 50/90* (2016.02); *G01V 3/10* (2013.01); *H02J 7/025* (2013.01); *H02J 50/12* (2016.02)

(58) Field of Classification Search
CPC ............ H02J 50/90; H02J 50/12; H02J 7/025; G01V 3/10
See application file for complete search history.

(56) References Cited

U.S. PATENT DOCUMENTS 9,059,599 B2 * 6/2015 Won .......................... H02J 50/50
9,397,505 B2 * 7/2016 Lee ........................... H02J 50/80
(Continued)

FOREIGN PATENT DOCUMENTS

CN 105814772 B * 11/2018 .............. H02J 50/80
JP 2014222994 11/2014
(Continued)

OTHER PUBLICATIONS

"India Application No. 201741013385 Examination Report", dated Aug. 29, 2019, 5 pages.
(Continued)

*Primary Examiner* — Stacy Whitmore
(74) *Attorney, Agent, or Firm* — DeLizio, Peacock, Lewin & Guerra, PLLC; John F. Guerra

(57) ABSTRACT

A wireless charging device includes a power source configured to generate a direct current (DC) voltage signal. Also, the wireless charging device includes a driver unit configured to receive the DC voltage signal and convert the DC voltage signal to a first alternating current (AC) voltage signal. Further, the wireless charging device includes a transmitting unit including a resonant capacitor and a resonant coil, coupled to the driver unit, wherein the transmitting unit is configured to receive and transmit the first AC voltage signal. Additionally, the wireless charging device includes a
(Continued)

control unit configured to detect a receiver device based on a change in at least one of a capacitive voltage across the resonant capacitor and an inductive voltage across the resonant coil if the receiver device is positioned within a predetermined distance from the transmitting unit.

23 Claims, 4 Drawing Sheets

(51) Int. Cl.
    *G01V 3/10*     (2006.01)
    *H02J 7/02*     (2016.01)

(56) References Cited

U.S. PATENT DOCUMENTS

| | | | |
|---|---|---|---|
| 9,413,429 B2* | 8/2016 | Park | H02J 50/80 |
| 10,714,977 B2* | 7/2020 | Ichikawa | G01R 15/06 |
| 2012/0235501 A1* | 9/2012 | Kesler | H02J 50/70 |
| | | | 307/104 |
| 2013/0134927 A1 | 5/2013 | Park et al. | |
| 2015/0214750 A1 | 7/2015 | Moshkovich et al. | |
| 2016/0094074 A1 | 3/2016 | Alves et al. | |
| 2016/0099604 A1* | 4/2016 | Von Novak, III | H02J 5/005 |
| | | | 320/108 |
| 2018/0083489 A1* | 3/2018 | Govindaraj | H02J 7/025 |
| 2019/0097448 A1* | 3/2019 | Partovi | H01F 38/14 |
| 2019/0148987 A1* | 5/2019 | Jung | H02J 7/00304 |
| | | | 307/104 |
| 2019/0356170 A1* | 11/2019 | Akuzawa | H02J 50/12 |
| 2020/0014244 A1* | 1/2020 | Nakao | H02J 50/12 |
| 2020/0021138 A1* | 1/2020 | Yeo | H01Q 9/0414 |
| 2021/0177226 A1* | 6/2021 | Burns | A47L 9/2852 |

FOREIGN PATENT DOCUMENTS

| | | | |
|---|---|---|---|
| KR | 1020130058423 | 6/2013 | |
| KR | 1020140121200 | 10/2014 | |
| KR | 1020150031357 | 3/2015 | |
| KR | 1020150046108 | 4/2015 | |
| WO | WO-2012109610 A1 * | 8/2012 | H04B 5/0075 |

OTHER PUBLICATIONS

International Search Report issued in connection with PCT/US2018/023060 dated Oct. 18, 2018.
Written Opinion of the International Searching Authority issued in connection with PCT/US2018/023060 dated Oct. 18, 2018.
"Chinese Application No. 201880024788.6 First Office Action", dated Nov. 3, 2022, 8 pages.

* cited by examiner

WIRELESS CHARGING DEVICE AND A METHOD FOR DETECTING A RECEIVER DEVICE

BACKGROUND

Embodiments of the present invention relate generally to power systems and more particularly to a wireless charging device and a method for detecting a receiver device.

In general, power transfer systems are used to transfer power from a power source to one or more receiver devices, such as for example, mobile devices, biomedical devices, portable consumer devices, an electric vehicle, and a hybrid vehicle. The power transfer systems are contact based power transfer systems or wireless power transfer systems. Within the contact based power transfer systems, interconnecting wires are used to transfer power from the power source to receiver devices. Such interconnecting wires may damage or corrode over a period of time. Further, interconnecting wires of a contact based power transfer system add to the overall weight of the system. Thus, wireless power transfer systems are desirable to transfer power from a power source to receiver devices.

Typically, in a conventional power transfer system, a charging device is used to convert an input power received from a power source to a transferrable power that is transmitted to charge one or more batteries in a receiver device. However, the charging device may continuously transmit the power even if the receiver device is not present. Such transmission of power results in power loss and affects efficiency of charging device.

Therefore, there is a need for an enhanced wireless charging device and a method for detecting receiver devices.

BRIEF DESCRIPTION

In accordance with one embodiment of the present invention, a wireless charging device is disclosed. The wireless charging device includes a power source configured to generate a direct current (DC) voltage signal. Also, the wireless charging device includes a driver unit coupled to the power source and configured to receive the DC voltage signal and convert the DC voltage signal to a first alternating current (AC) voltage signal. Further, the wireless charging device includes a transmitting unit including a resonant capacitor and a resonant coil, coupled to the driver unit, wherein the transmitting unit is configured to receive and transmit the first AC voltage signal. In addition, the wireless charging device includes a control unit coupled to the transmitting unit and configured to detect a receiver device based on a change in at least one of a capacitive voltage across the resonant capacitor and an inductive voltage across the resonant coil if the receiver device is positioned within a predetermined distance from the transmitting unit.

In accordance with another embodiment of the present invention, a method for detecting a receiver device is disclosed. The method includes generating, by a power source, a DC voltage signal. Also, the method includes converting, by a driver unit, the DC voltage signal to a first AC voltage signal. Further, the method includes transmitting, by a transmitting unit, the first AC voltage signal. In addition, the method includes detecting, by a control unit, a receiver device based on a change in at least one of a capacitive voltage across a resonant capacitor and an inductive voltage across a resonant coil of the transmitting unit if the receiver device is positioned within a predetermined distance from the transmitting unit.

DRAWINGS

These and other features, aspects, and advantages of the present disclosure will become better understood when the following detailed description is read with reference to the accompanying drawings in which like characters represent like parts throughout the drawings, wherein:

FIG. 1 a block diagram of a wireless power transfer system in accordance with an embodiment of the present invention;

DETAILED DESCRIPTION

As will be described in detail hereinafter, various embodiments of a system and a method for charging one or more receiver devices are disclosed. In particular, embodiments of the system and the method disclosed herein detects the receiver device prior to transmitting power to the receiver device. Also, the system and the method disclosed herein detects the misalignment of the receiver device with reference to a wireless charging device.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. The use of terms "including," "comprising" or "having" and variations thereof herein are meant to encompass the items listed thereafter and equivalents thereof as well as additional items. The terms "connected" and "coupled" are not restricted to physical or mechanical connections or couplings and can include electrical connections or couplings, whether direct or indirect. Furthermore, terms "circuit" and "circuitry" and "control unit" may include either a single component or a plurality of components, which are either active and/or passive and are connected or otherwise coupled together to provide the described function. In addition, the term operationally coupled as used herein includes wired coupling, wireless coupling, electrical coupling, magnetic coupling, radio communication, software based communication, or combinations thereof.

Figure 1:
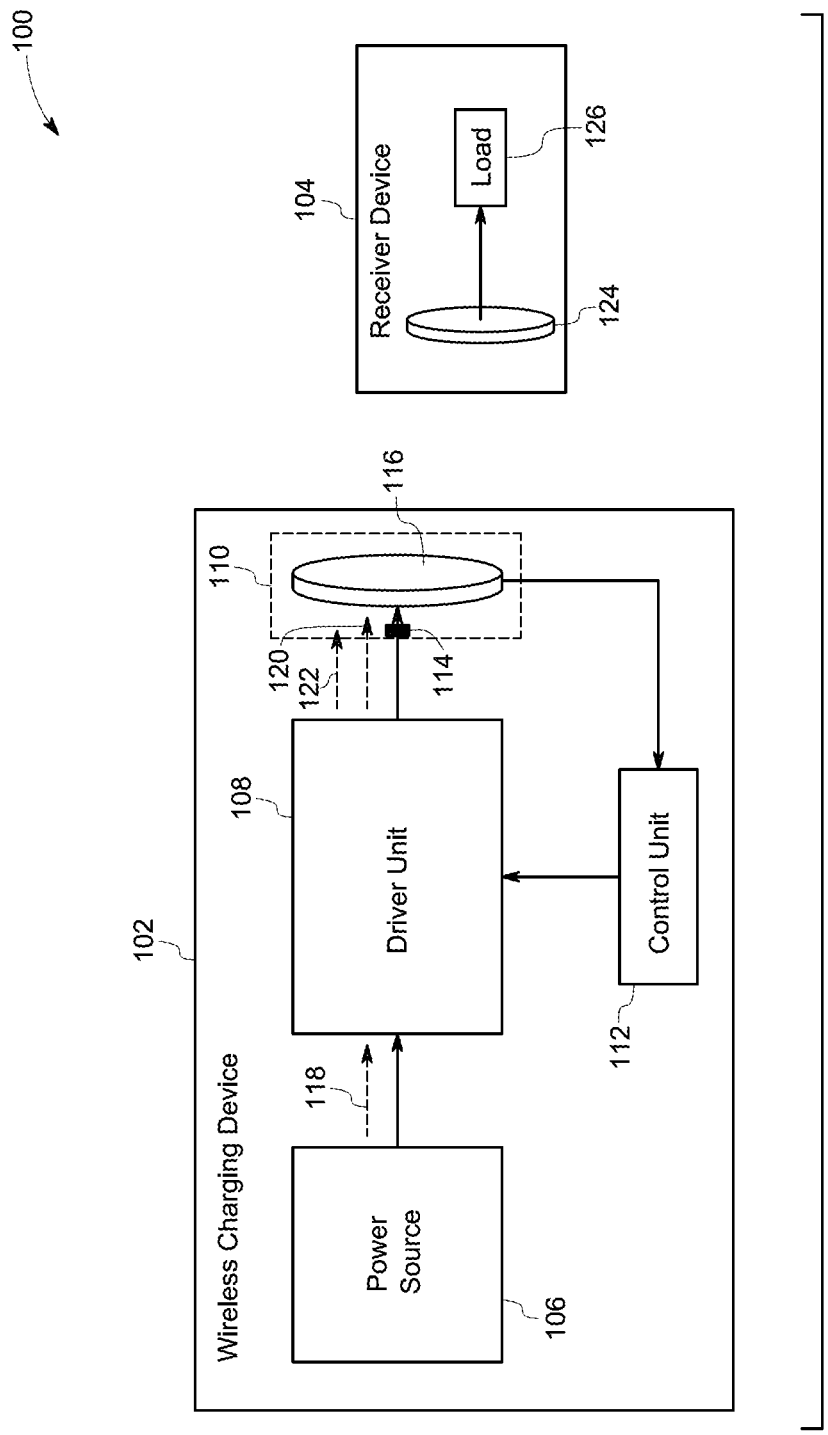

FIG. 1 is a diagrammatical representation of a wireless power transfer system 100 in accordance with an embodiment of the present invention. The wireless power transfer system 100 includes a wireless charging device 102 and a receiver device 104. The receiver device 104 may include a mobile device, a biomedical device, a portable consumer device, or the like. In certain other embodiments, the wireless charging device 102 may include a power transmitting device, such as a power bank, a charging pad, or the like. For ease of understanding, only one receiver device 104 is depicted in FIG. 1. In other embodiments, the wireless power transfer system 100 may include a plurality of receiver devices that are compatible with one of the wireless frequency standards. In one example, the wireless frequency standards include a Power Matters Alliance (PMA) standard, an Air Fuel Alliance standard, a Wireless Planning and Coordination (WPC) standard, and the like.

The wireless charging device 102 includes a power source 106, a driver unit 108, a transmitting unit 110, and a control unit 112. The power source 106 is configured to supply input power having a DC voltage signal 118 to the driver unit 108. In some embodiments, the input power may be in a range from about 0.1 Watts to 200 Watts. The magnitude of the DC voltage signal is in a range from about 300 Volts to about 350 Volts. It may be noted that the power source 106 may be positioned within the wireless charging device 102 or external to the wireless charging device 102. In one embodiment, the power source 106 may include an AC sub-source (not shown) and an AC/DC converter (not shown). Further, the AC/DC converter is configured to receive an AC voltage signal from the AC sub-source and convert the AC voltage signal to the DC voltage signal 118. Further, the AC/DC converter transmits the converted DC voltage signal 118 to the driver unit 108.

The driver unit 108 is electrically coupled to the power source 106, the transmitting unit 110, and the control unit 112. The driver unit 108 is configured to receive the input power having the DC voltage signal 118 from the power source 106. Further, the driver unit 108 is configured to convert the DC voltage signal 118 to a first AC voltage signal 120 or a second AC voltage signal 122. The first AC voltage signal 120 is also referred to as a low power signal that is used for detecting the receiver device 104 in the system 100. In one embodiment, the first AC voltage signal 120 includes a first power having a value that is in a range from about 1% to about 5% of the nominal input power. Similarly, the second AC voltage signal 122 is also referred to as a high power signal that is used for supplying power to a load 126, such as one or more batteries in the receiver device 104. In one embodiment, the second AC voltage signal 122 includes a second power having a value that is in a range from about 50% to about 100% of the nominal input power. In one embodiment, the first AC voltage signal 120 is generated when the wireless charging device 102 is operating in a sleep mode or a low power mode. Similarly, the second AC voltage signal 122 is generated when the wireless charging device 102 is operating in a normal mode or power transmission mode. The value of second power of the second AC voltage signal 122 is greater than the value of first power of the first AC voltage signal 120.

The transmitting unit 110 is configured to transmit the first AC voltage signal 120 or the second AC voltage signal 122 received from the driver unit 108. In the exemplary embodiment, the transmitting unit 110 includes a resonant capacitor 114 and a resonant coil 116 that resonates at a predefined frequency to transmit the first AC voltage signal 120 or the second AC voltage signal 122 to the receiver device 104.

In conventional power transfer systems, a charging device is used to convert an input power received from the power source to a transferrable power that is transmitted to charge one or more batteries in the receiver device. However, the charging device may continuously transmit the power even if the receiver device is not present in the system. As a result, there is a loss of power and the efficiency of the charging device is affected. Further, maintenance cost of the power transfer system may be substantially increased.

To overcome the above problems/drawbacks associated with the conventional systems, the exemplary wireless charging device 102 includes the control unit 112 that is configured to detect the receiver device 104. Particularly, when the first AC voltage signal 120 is transmitted, the control unit 112 measures a voltage drop across the resonant capacitor 114 and a voltage drop across the resonant coil 116. It may be noted herein that the voltage drop across the resonant capacitor 114 is also referred to as "capacitive voltage" and the voltage drop across the resonant coil 116 is also referred to as "inductive voltage." The control unit 112 detects the receiver device 104 based on a change in at least one of the capacitive voltage and the inductive voltage. More specifically, if the receiver device 104 is present, a receiver coil 124 in the receiver device 104 receives the first AC voltage signal 120 from the wireless charging device 102. As a result, the capacitive voltage and the inductive voltage of the transmitting unit 110 changes substantially. In one embodiment, the capacitive voltage and inductive voltage may change about 50% from a predefined voltage value. In some embodiments, the capacitive voltage increases by 50% from the predefined voltage value, while the inductive voltage decreases by 50% from the predefined voltage value. Such a change in the capacitive voltage or the inductive voltage is measured by the control unit 112 to detect the presence of the receiver device 104. In one embodiment, the control unit 112 may measure a change in both the voltages, such as the capacitive voltage and the inductive voltage to confirm the presence of the receiver device 104. It may be noted that the change in the voltages may be referred to as the change in magnitude, phase, or frequency of the corresponding voltages. The wireless charging device 102 is capable of detecting the receiver device 104 even if the receiver device 104 is located at a predetermined distance from the charging device 102. In some embodiments, the predetermined distance may be in a range from about 5 mm to 500 mm. Upon detecting the receiver device 104, the control unit 112 drives the driver unit 108 to transmit the second AC voltage signal 122 to the detected receiver device 104 for charging the load 126 such as one or more batteries. The aspect of detecting the receiver device 104 is explained in greater detail with reference to FIG. 2.

By employing the exemplary wireless charging device 102, the input power may be wirelessly transmitted after detecting the receiver device 104, which in turn reduces power loss in the wireless power transfer system 100 and improves efficiency of the wireless charging device 102.

Figure 2:
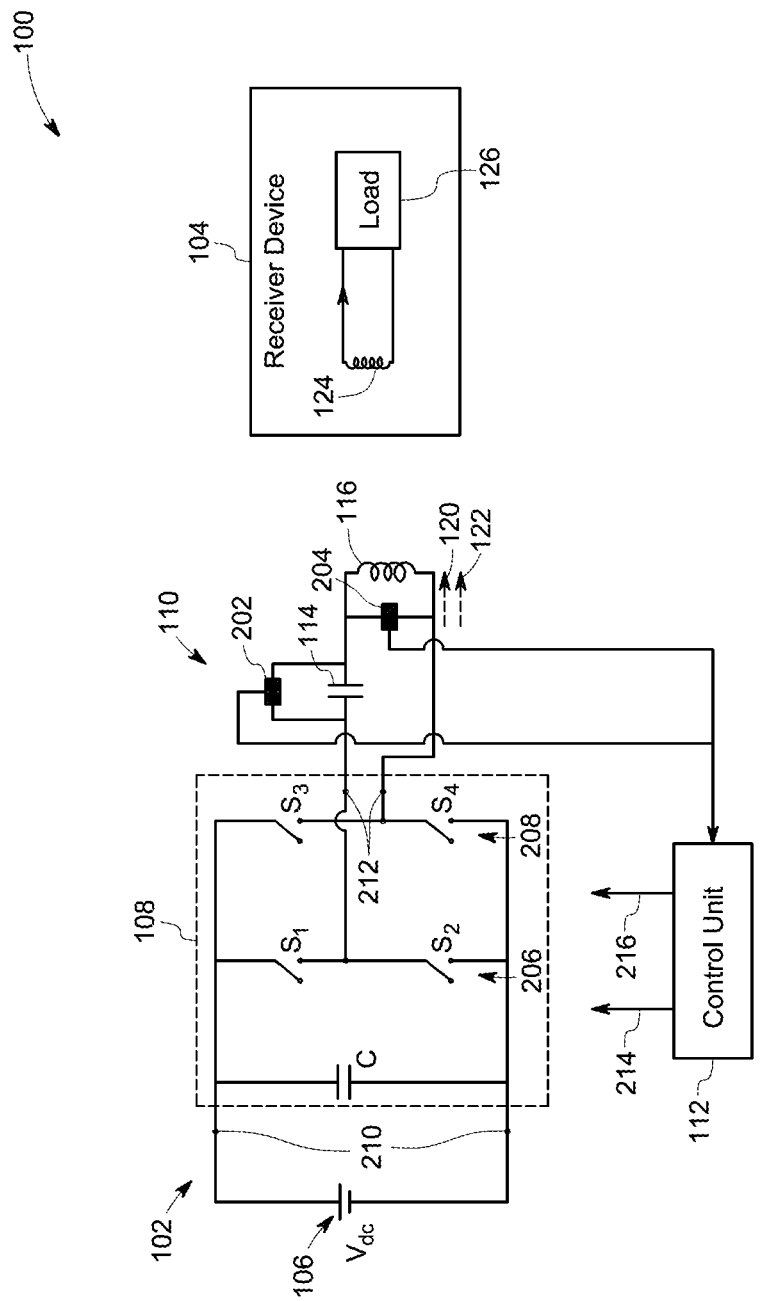
FIG. 2 is a detailed schematic representation of a wireless power transfer system in accordance with an embodiment of the present invention.

Referring to FIG. 2, a schematic representation of the wireless power transfer system 100 in accordance with embodiments of the present invention is depicted. The wireless power transfer system 100 includes the wireless charging device 102 that is capable of magnetically coupling to the receiver device 104 for performing wireless power transmission to the receiver device 104. The wireless charging device 102 includes the power source 106, the driver unit 108, the transmitting unit 110, the control unit 112, a first voltage sensor 202, and a second voltage sensor 204.

Figure 4:
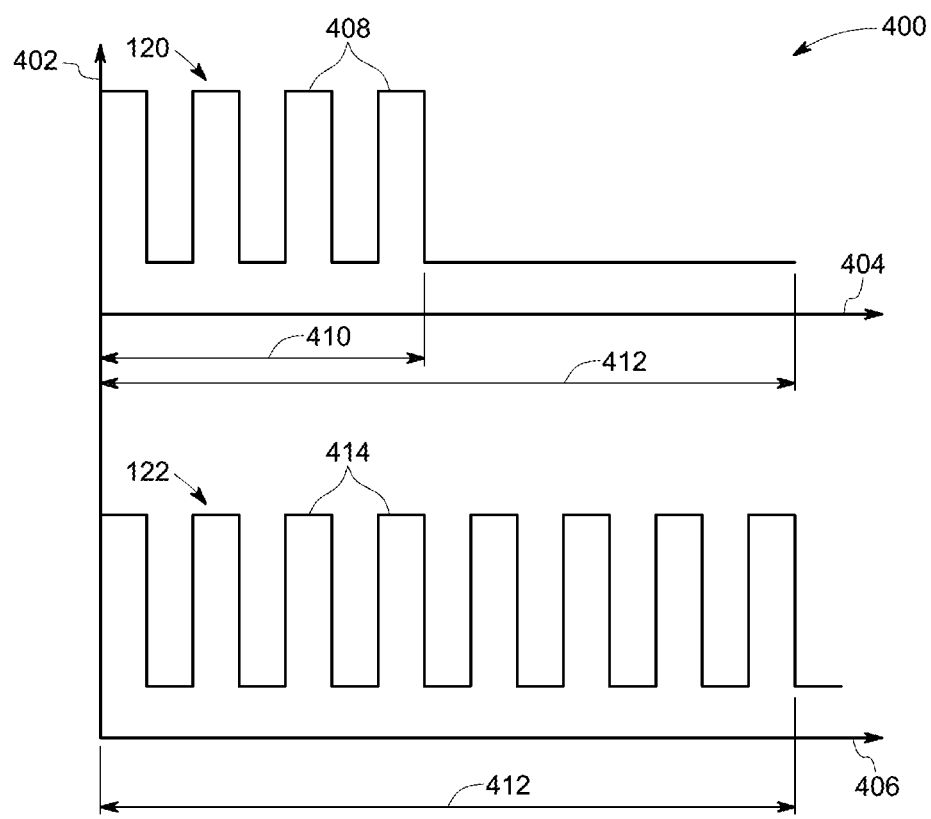
FIG. 4 is a graphical representation of the first AC voltage signal and the second AC voltage signal, in accordance with embodiments of the present invention.

The driver unit 108 includes a first leg of switches 206 and a second leg of switches 208 that are arranged to form a bridge circuit between first terminals 210 and second terminals 212 of the driver unit 108. The first leg of switches 206 and the second leg of switches 208 are activated or deactivated based on control signals received from the control unit 112 to generate the first AC voltage signal 120 or the second AC voltage signal 122. In particular, if a first control signal 214 is received from the control unit 112, the driver unit 108 converts the DC voltage signal 118 to the first AC voltage signal 120 having low power to detect the presence of the receiver device 104. More specifically, the driver unit 108 converts the DC voltage signal 118 to the first AC voltage signal 120 having pulses generated for a predefined time interval within a predetermined time window so that an average power of the first AC voltage signal 120 is less than or equal to a threshold power value. The average power in the first AC voltage signal is referred to as a "first power value." In one example, the threshold power value may be in a range from about 1% to about 5% of the nominal input power. In another example, the predefined time interval may be in a range from about 5 milliseconds to about 15 milliseconds of the predetermined time window of 1 second. It may be noted that the first AC voltage signal 120 having the pulses for the predefined time interval is depicted in FIG. 4.

In a similar manner, if a second control signal 216 is received from the control unit 112, the driver unit 108 converts the DC voltage signal 118 to the second AC voltage signal 122 having high power to charge one or more batteries 126 in the receiver device 104. More specifically, the driver unit 108 converts the DC voltage signal 118 to the second AC voltage signal 122 having continuous pulses so that the average power in the second AC voltage signal is approximately same as the nominal input power. The average power of the second AC voltage signal is referred to as a "second power value." The second power value is greater than the first power value. The second AC voltage signal having the continuous pulses is depicted in FIG. 4.

The transmitting unit 110 includes the resonant coil 116 and the resonant capacitor 114 that are electrically coupled to the second terminals 212 of the driver unit 108. The resonant coil 116 and the resonant capacitor 114 resonates at a predefined frequency to transmit the first AC voltage signal 120 or the second AC voltage signal 122 to the receiver device 104. It may be noted that the predefined frequency may also be referred as a "resonant frequency."

When the driver unit 108 drives the resonant coil 116 to transmit the first AC voltage signal 120 or the second AC voltage signal 122, voltage drops across the resonant capacitor 114 and the resonant coil 116. The voltage drop across the resonant capacitor 114 is also referred to as the capacitive voltage and the voltage drop across the resonant coil 116 is referred to as the inductive voltage.

In the illustrated embodiment, the first voltage sensor 202 is coupled across the resonant capacitor 114 and configured to measure the capacitive voltage across the resonant capacitor 114. The first voltage sensor 202 transmits the measured capacitive voltage to the control unit 112. In a similar manner, the second voltage sensor 204 is coupled across the resonant coil 116 and configured to measure the inductive voltage across the resonant coil 116. The second voltage sensor 204 transmits the measured inductive voltage to the control unit 112.

During operation, the control unit 112 transmits the first control signal 214 to the driver unit 108 to generate the first AC voltage signal 120. Further, the driver unit 108 transmits the generated first AC voltage signal 120 via the transmitting unit 110. When the first AC voltage signal 120 is transmitted via the transmitting unit 110, the first voltage sensor 202 measures and transmits the capacitive voltage to the control unit 112. Similarly, the second voltage sensor 204 measures and transmits the inductive voltage to the control unit 112.

Further, the control unit 112 detects the receiver device 104 based on a change in the capacitive voltage and the inductive voltage. In particular, if the receiver device 104 is positioned within a predetermined distance from the wireless charging device 102, the receiver coil 124 of the receiver device 104 receives the first AC voltage signal 120 from the wireless charging device 102. As a consequence, characteristics of the resonant capacitor 114 and the resonant coil 116 changes substantially. In one embodiment, the characteristics of the resonant capacitor 114 include an impedance of the resonant capacitor 114 and the characteristics of the resonant coil 116 include an impedance of the resonant coil 116. In one example, a mutual inductance between the charging device 102 and the receiver device 104 may cause the characteristics, such as the impedance of the resonant capacitor 114 and the resonant coil 116 to change substantially. This change in the characteristics of the resonant capacitor 114 and the resonant coil 116 causes the capacitive voltage and the inductive voltage to change substantially from an initial or predefined voltage value. In one embodiment, the control unit 112 determines a peak voltage value or a root mean square (RMS) voltage value of the capacitive voltage to detect the change in the capacitive voltage. Similarly, the control unit 112 determines a peak voltage value or a root mean square (RMS) voltage value of the inductive voltage to detect the change in the inductive voltage. It may be noted that the change in the voltages may be referred to as the change in magnitude, phase, or frequency of the corresponding voltages.

The control unit 112 verifies whether the change in the capacitive voltage or the inductive voltage is greater than a threshold voltage value. If the change in the capacitive voltage or the inductive voltage is greater than the threshold voltage value, the control unit 112 detects presence of the receiver device 104. In one example, the control unit 112 may verify whether the change in the capacitive voltage and the inductive voltage is greater than the threshold voltage value. If the change in the capacitive voltage and the inductive voltage is greater than the threshold voltage value, the control unit 112 detects presence of the receiver device 104. By verifying both the voltages (capacitive and inductive voltages), the control unit 112 may improve the detectability and may also confirm the presence of the receiver device 104.

In another embodiment, the control unit 112 may compute a ratio of the capacitive voltage to the inductive voltage. Further, the control unit 112 verifies whether this ratio of the capacitive voltage to the inductive voltage is greater than a threshold voltage ratio value. If the ratio of the capacitive voltage to the inductive voltage is greater than the threshold voltage ratio value, the control unit 112 detects presence of the receiver device 104 is present. In one embodiment, the control unit 112 detects that the receiver device 104 is within predetermined distance from the charging device 102.

When the receiver device 104 is detected, the control unit 112 transmits the second control signal 216 to the driver unit 108 to convert the DC voltage signal 118 to the second AC voltage signal 122. Further, the converted second AC voltage signal 122 is transmitted to the detected receiver device 104 via the resonant coil 116 of the transmitting unit 110. The receiver coil 124 of the receiver device 104 is used to receive the second AC voltage signal 122 from the resonant coil 116. Further, the received second AC voltage signal 122 is processed and transmitted to the load 126 such as one or more batteries in the receiver device 104. In one example, the second AC voltage signal 122 may be processed and/or converted to a load DC voltage signal. The load DC voltage signal is used to charge one or more batteries 126 in the receiver device 104. In one embodiment, when the second AC voltage signal 122 is transmitted, the control unit 112 is configured to determine a state of charge (SoC) of the receiver device 104 based on the capacitive voltage of the resonant capacitor 114 and the inductive voltage of the resonant coil 116. In one example, the control unit 112 determines a ratio of the capacitive voltage of the resonant capacitor 114 to the inductive voltage of the resonant coil 116. Further, the control unit 112 determines the state of charge (SoC) of the receiver device based on the ratio of the capacitive voltage of the resonant capacitor 114 to the inductive voltage of the resonant coil 116. The control unit 112 may stop transmission of the second AC voltage signal 122 if the state of charge of the receiver device 104 is greater than a threshold charge value.

In one embodiment, the control unit 112 may stop transmission of the second AC voltage signal 122 if the receiver device 104 is not within the predetermined distance from the transmitting unit 110. In particular, when the second AC voltage signal 122 is transmitted, the control unit 112 determines the capacitive voltage across the resonant capacitor 114 and the inductive voltage across the resonant coil 116. Further, if the receiver device 104 is not within the predetermined distance from the transmitting unit 110, the change in the capacitive voltage and the inductive voltage is reduced below or equal to the threshold voltage value. This change in the capacitive voltage and inductive voltage is used by the control unit 112 to determine that the receiver device 104 is not within the predetermined distance from the transmitting unit 110. Also, the control unit 112 drives the driver unit 108 to stop transmission of the second AC voltage signal 122 if the change in at least one of the capacitive voltage and the inductive voltage is less than or equal to the threshold voltage value.

In one embodiment, the control unit 112 is configured to detect misalignment of the receiver device 104 with reference to the wireless charging device 102 based on the measured capacitive voltage and the inductive voltage. More specifically, the control unit 112 measures the capacitive voltage of the resonant capacitor 114 and the inductive voltage of the resonant coil 116. If a change in the capacitive voltage or the inductive voltage is greater than a predefined misalignment value, the control unit 112 confirms that the receiver device 104 is misaligned with reference to the wireless charging device 102. In one embodiment, the control unit 112 may verify a change in both the voltages, such as the capacitive voltage and the inductive voltage to confirm the misalignment of the receiver device 104 with reference to the wireless charging device 102. Also, the control unit 112 may indicate the detected misalignment to a user of the wireless charging device 102. In one embodiment, the control unit 112 may use one or more light units, such as light emitting diodes (LEDs) and/or audio units such as beepers to indicate the misalignment of the receiver device 104 to the user.

Figure 3:
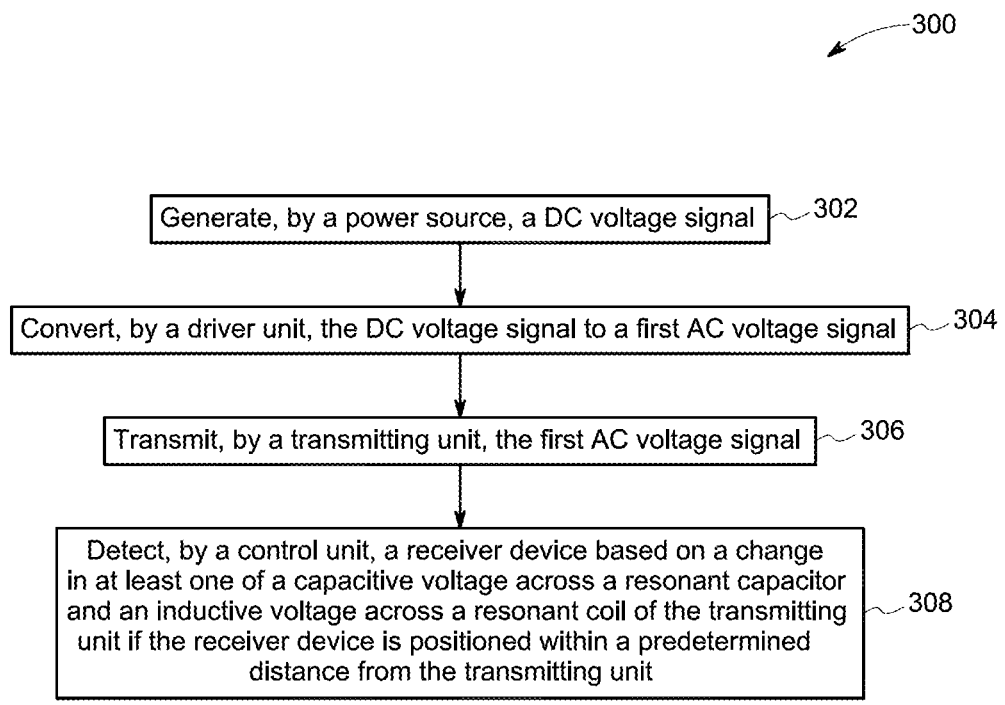
FIG. 3 is a flow chart illustrating a method for detecting a receiver device in accordance with embodiments of the present invention.

Referring to FIG. 3, a flow chart illustrating a method 300 for detecting a receiver device in accordance with embodiments of the present invention is depicted. For ease of understanding, the method 300 is described with reference to the components of FIGS. 1 and 2. At step 302, a DC voltage signal is generated from a power source. In particular, the power source supplies an input power having the DC voltage signal to the driver unit. The power source may be a power bank, a battery, or an energy storage module. In another example, the power source may include a AC sub-source and an AC/DC converter to supply the DC voltage signal to the driver unit.

Subsequently, at step 304, the DC voltage signal is converted to a first AC voltage signal. The driver unit of a wireless charging device receives the first control signal from the control unit. In response, the driver unit converts the DC voltage signal to the first AC voltage signal. In one embodiment, the first AC voltage signal includes pulses generated for a predefined time interval in a predetermined time window so that an average power of the first AC voltage signal is less than a threshold power value.

At step 306, the transmitting unit of the wireless charging device transmits the first AC voltage signal. In particular, the transmitting unit includes the resonant coil and the resonant capacitor that are electrically coupled to the driver unit. The resonant coil and the resonant capacitor resonates at the predefined frequency to transmit the first AC voltage signal. When the first AC voltage signal is transmitted, voltage drops across the resonant capacitor and the resonant coil. The voltage drop across the resonant capacitor is referred to as a capacitive voltage and the voltage drop across the resonant coil is referred to as an inductive voltage.

At step 308, a receiver device is detected based on a change in at least one of the capacitive voltage across the resonant capacitor and the inductive voltage across the resonant coil of the transmitting unit. Particularly, if the receiver device is positioned within a predetermined distance from the transmitting unit, the receiver coil of the receiver device receives the first AC voltage signal from the transmitting unit. As a result, characteristics of the resonant capacitor and the resonant coil changes substantially. In one embodiment, the characteristics of the resonant capacitor and the resonant coil include an impedance. The change in the characteristics of the resonant capacitor and the resonant coil causes the capacitive voltage and the inductive voltage to change substantially from an initial or predefined voltage value. If the change in the capacitive voltage or the inductive voltage is greater than the threshold voltage value, the control unit detects the presence of the receiver device. In one embodiment, the control unit 112 may measure a change in both the voltages, such as the capacitive voltage and the inductive voltage to confirm the presence of the receiver device 104. In another embodiment, if a ratio of the capacitive voltage to the inductive voltage is greater than the threshold voltage ratio value, the control unit detects the presence of the receiver device.

FIG. 4 illustrates a graphical representation 400 of the first AC voltage signal 120 and the second AC voltage signal 122 in accordance with embodiments of the present invention. Y-axis 402 represents a magnitude of the first AC voltage signal 120 and the second AC voltage signal 122. Similarly, a first X-axis 404 represents a time period of the first AC voltage signal 120 and a second X-axis 406 represents a time period of the second AC voltage signal 122.

As depicted in FIG. 4, the first AC voltage signal 120 includes pulses 408 that are generated for a predefined time interval 410 within a predetermined time window 412 so that an average power of the first AC voltage signal 120 is less than or equal to a threshold power value. In one example, the predefined time interval 410 may be about 10 milliseconds of the predetermined time window 412 of about 1 second. It may be noted that these pulses 408 are repeatedly transmitted in each of the time windows 412 until the receiver device 104 is detected. Furthermore, the second AC voltage signal 122 includes pulses 414 that are continuously generated within the predetermined time window 412. These pulses 414 are used for transmitting power that is used for charging the receiver device 104.

In accordance with the exemplary embodiments discussed herein, the exemplary system and method facilitate to detect the presence of the receiver device. In particular, the system and method disclosed herein allow charging devices, such as power banks to transmit power only after detecting the presence of the receiver device. As a result, power loss is reduced and efficiency of the charging devices is improved. Further, the exemplary system and method facilitate to reduce electromagnetic interference (EMI) and thereby meet regulatory standards. Also, the system and method facilitate to detect misalignment of the receiver device with reference to the wireless charging device.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A wireless charging device comprising:
a power source configured to generate a direct current (DC) voltage signal;
a driver unit coupled to the power source and configured to receive the DC voltage signal and convert the DC voltage signal to a first alternating current (AC) voltage signal;
a transmitting unit comprising a resonant capacitor and a resonant coil, wherein the transmitting unit is configured to receive the first AC voltage signal from the driver unit and transmit the first AC voltage signal;
one or more sensors coupled to the transmitting unit and configured to measure a capacitive voltage across the resonant capacitor, an inductive voltage across the resonant coil, or both; and
a control unit coupled to the transmitting unit and configured to detect a receiver device based on a change in the capacitive voltage, the inductive voltage, or both.

2. The wireless charging device of claim 1, wherein the one or more sensors includes:
a first voltage sensor coupled across the resonant capacitor and configured to measure the capacitive voltage across the resonant capacitor and provide the capacitive voltage to the control unit; and
a second voltage sensor coupled across the resonant coil and configured to measure the inductive voltage across the resonant coil and provide the inductive voltage to the control unit.

3. The wireless charging device of claim 1, wherein the control unit is configured to detect the receiver device if the change in at least one of the capacitive voltage and the inductive voltage is greater than a threshold voltage value.

4. The wireless charging device of claim 1, wherein the control unit is configured to detect the receiver device if a ratio of the capacitive voltage to the inductive voltage is greater than a threshold voltage ratio value.

5. The wireless charging device of claim 1, wherein the control unit is configured to drive the driver unit to transmit the first AC voltage signal having a first power until the receiver device is detected.

6. The wireless charging device of claim 1, wherein the control unit is configured to detect misalignment of the receiver device with reference to the wireless charging device based on at least one of the capacitive voltage and the inductive voltage.

7. The wireless charging device of claim 1, wherein the control unit is configured to drive the driver unit to transmit a second AC voltage signal having a second power after the receiver device is detected.

8. The wireless charging device of claim 7, wherein the control unit is configured to determine a state of charge (SoC) of the receiver device based on the capacitive voltage of the resonant capacitor and the inductive voltage of the resonant coil when the second AC voltage signal is transmitted to the receiver device.

9. The wireless charging device of claim 8, wherein the control unit is configured to stop transmission of the second AC voltage signal if the SoC of the receiver device is greater than a threshold charge value.

10. The wireless charging device of claim 7, wherein the control unit is configured to stop transmission of the second AC voltage signal if the receiver device is not within a predetermined distance from the transmitting unit.

11. The wireless charging device of claim 10, wherein the control unit is configured to determine that the receiver device is not within the predetermined distance from the transmitting unit if the change in at least one of the capacitive voltage and the inductive voltage is less than or equal to a threshold voltage value.

12. The wireless charging device of claim 1, wherein the receiver device is a mobile device, a biomedical device, a portable consumer device, an electric vehicle, or a hybrid vehicle.

13. A method comprising:
generating, by a power source, a DC voltage signal;
converting, by a driver unit, the DC voltage signal to a first AC voltage signal;
transmitting, by a transmitting unit, the first AC voltage signal;
measuring, by one or more sensors coupled to the transmitting unit, a capacitive voltage across a resonant capacitor of the transmitting unit, an inductive voltage across a resonant coil of the transmitting unit, or both; and
detecting, by a control unit, a receiver device based on a change in the capacitive voltage, the inductive voltage, or both.

14. The method of claim 13, wherein the one or more sensors includes:
a first voltage sensor coupled across a resonant capacitor of the transmitting unit and configured to measure the capacitive voltage across the resonant capacitor and provide the capacitive voltage to the control unit; and
a second voltage sensor coupled across a resonant coil of the transmitting unit and configured to measure the inductive voltage across the resonant coil and provide the inductive voltage to the control unit.

15. The method of claim 13, further comprising detecting, by the control unit, the receiver device if the change in at least one of the capacitive voltage and the inductive voltage is greater than a threshold voltage value.

16. The method of claim 13, further comprising detecting, by the control unit, the receiver device if a ratio of the capacitive voltage to the inductive voltage is greater than a threshold voltage ratio value.

17. The method of claim 13, wherein transmitting the first AC voltage signal comprises transmitting the first AC voltage signal having a first power until the receiver device is detected.

18. The method of claim 13, further comprising detecting misalignment of the receiver device with reference to a wireless charging device based on at least one of the capacitive voltage of the resonant capacitor and the inductive voltage of the resonant coil.

19. The method of claim 13, further comprising transmitting a second AC voltage signal having a second power after the receiver device is detected.

20. The method of claim 19, further comprising determining a state of charge (SoC) of the receiver device based on the capacitive voltage of the resonant capacitor and the inductive voltage of the resonant coil.

21. The method of claim 20, further comprising stopping transmission of the second AC voltage signal if the SoC of the receiver device is greater than a threshold charge value.

22. The method of claim 13, further comprising determining a peak voltage value or a root mean square (RMS) voltage value of the capacitive voltage to detect the change in the capacitive voltage across the resonant capacitor.

23. The method of claim 13, further comprising determining a peak voltage value or a root mean square (RMS) voltage value of the inductive voltage to detect the change in the inductive voltage across the resonant coil.

* * * * *